United States Patent [19]

Nagao

[11] Patent Number: 4,890,171

[45] Date of Patent: Dec. 26, 1989

[54] HIGH SPEED INFORMATION RETRIEVAL APPARATUS

[75] Inventor: Tatsuro Nagao, Saitama, Japan

[73] Assignee: Pioneer Electronic Corporation, Tokyo, Japan

[21] Appl. No.: 183,808

[22] Filed: Apr. 20, 1988

[30] Foreign Application Priority Data

Apr. 20, 1987 [JP] Japan .............................. 62-58612[U]

[51] Int. Cl.$^4$ .............................................. G11B 15/46
[52] U.S. Cl. ................................ 360/73.05; 360/72.2; 360/73.08
[58] Field of Search .................... 360/73.05, 72.1, 72.2, 360/72.3, 73.01, 73.06, 73.07, 73.08, 71; 242/186, 188, 191

[56] References Cited

U.S. PATENT DOCUMENTS 4,328,520 5/1982 Iwata et al. ........................ 360/73.06
4,731,679 3/1988 O'Gwynn et al. .................. 360/72.2

FOREIGN PATENT DOCUMENTS

0013379 1/1985 Japan ................................... 360/72.2

*Primary Examiner*—Stuart N. Hecker
*Assistant Examiner*—David J. Severin
*Attorney, Agent, or Firm*—Sughrue, Mion, Zinn, Macpeak & Seas

[57] ABSTRACT

A high speed information retrieval apparatus that carries out program retrieval and reproduction on the basis of program numbers used as subcodes corresponding to individual information programs recorded on the magnetic tape. Two high speed search operations are used in moving the tape from a current position to an object position. A memory is used to store code representations of program positions, and a position information calculation circuit determines tape position based on a detection of tape reel rotation. In one high speed search mode, the memory and calculation circuit output are compared to determine position. In another high speed search mode, the subcode on the tape is compared to a current tape position. When the object program number is stored in the memory, the mechanism block is set to a second high speed running mode by a control circuit. The block stays in that mode until the current tape position comes within a threshold distance of the object position. When the object position is not stored in the memory, or the threshold distance is reached in the second mode, the mechanism block is set to a first high speed running mode.

4 Claims, 6 Drawing Sheets

HIGH SPEED INFORMATION RETRIEVAL APPARATUS

FIELD OF THE INVENTION

The present invention relates to a high speed information retrieval apparatus which retrieves and reproduces desired information programs at a high speed based on the use of program numbers. The numbers comprise subcode information that corresponds to individual information programs recorded on a magnetic tape in an R-DAT (rotary head type digital audio tape recorder) or 8 mm video tape recorder.

BACKGROUND OF THE INVENTION

Figure 6:
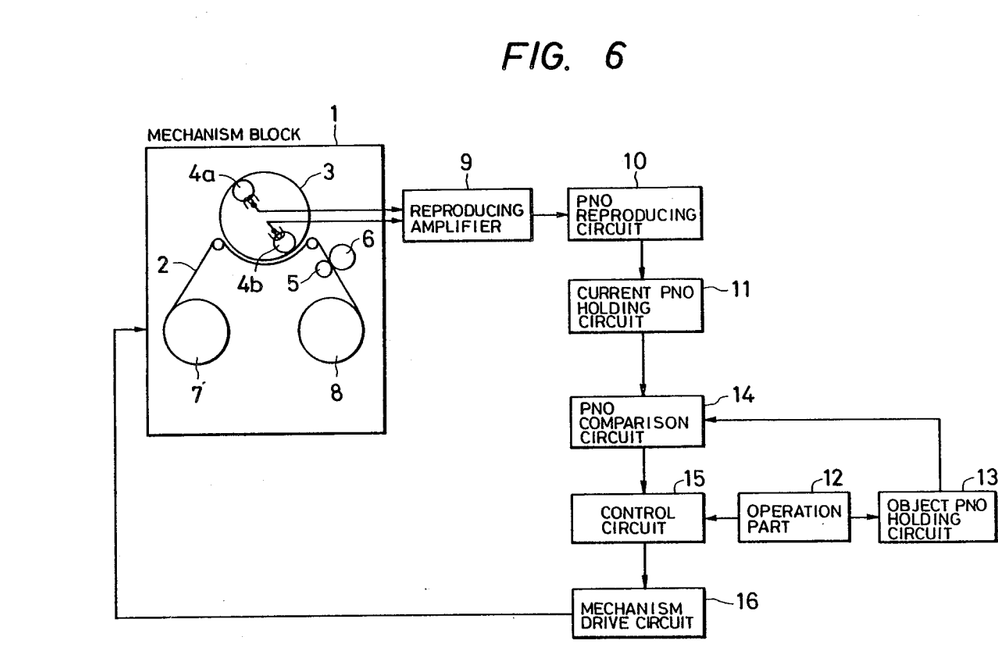
FIG. 6 is a block diagram of a disadvantageous approach.

One example of an apparatus that can realize the retrieval of desired information programs based on the program number (PNO) is illustrated in FIG. 6. In this figure, a mechanism block 1 contains a magnetic tape 2 having program numbers corresponding to a plurality of information programs. The magnetic tape is wound on supply reel 7 and take-up reel 8. The tape runs along the circumferential surface of a rotary drum 3, within a section having an angular range of 90°. The tape loads a pair of heads 4a, 4b arranged with an angular interval of 180°. capstan 5 and pinch roller 6 operate to drive the magnetic tape 2 in a conventional manner. For example, when the magnetic tape 2 is run at an ordinary speed for reproduction or even at an intermediate speed (about 10 times or more than the ordinary speed). the driving force of he capstan 5 and pinch roller 6 is adequate. However, when the tape is run at a high speed (about 100 times to 200 times the ordinary speed for reproduction) it is driven by the supply reel 7 or take-up reel 8.

A reproduction amplifier 9 is connected to the block 1 and amplifies reproduced signals alternately picked up from the heads 4a, 4b. A program number reproducing circuit 10 receives the amplified signals and operates to reproduce program numbers, as subcode information, from the heads 4a, 4b sent via reproduction amplifier 9. A current program number holding circuit 11 holds program numbers of the current position reproduced by the program number reproducing circuit 10.

An operation part 12 sends to a control circuit 15 and an object PNO holding circuit 13 a program number input identifying a desired search position. Control circuit 15 produces an initiation instruction input for controlling the reproducing operation of the information program and the search operation. Object program number holding circuit 13 operates to hold program numbers identified as a search position input by the operation part 12. Program number comparison circuit 14 acts to compare values of the program numbers held in the current program number holding circuit 11 and object program number holding circuit 13. Control circuit 15 controls a mechanism drive circuit 16 based on an output sent from the operation part 12 and program number comparison circuit 14. Circuit 15 also controls the mechanism block 1 in an operation mode, such as a reproduction mode, and in a search mode, such as a search operation for information programs.

The operation of an apparatus having the structure of FIG. 6 may be easily explained. Let it be assumed that a program number of the desired search position is designated by the operation part 12. A program number reproduced by the program number reproducing circuit 10 is held in the current program number holding circuit 11. Let it also be assumed that the program number of the search position is held in the object program number holding circuit 13.

When initiation of a search operation is designated by the operation part 12, the control circuit 15 will shift the mechanism drive circuit 16 to the high speed search operation mode in the FWD or REV direction based on the output from the program number comparison circuit 14, namely the result of a comparison of values of the current program number and object program number. In this manner, the mechanism drive circuit 16 controllably drives the mechanism block 1.

During the high speed search operation, the control circuit 15 always Watches the output of the program number comparison circuit 14. When the program numbers in the current program number holding circuit 11 and the object program number holding circuit 13 match, the control circuit 15 controls the mechanism drive circuit 16 to set the mechanism block 1 to an intermediate speed running condition. In this manner the apparatus initiates a so-called "precise quick-start of reproduction".

When the object program number is detected during preparation for a precise quick-start of reproduction, the search operation at the desired search position is completed. However, if the starting end or terminating end of the magnetic tape is detected by a detection means (not illustrated) during the high speed search operation, the high speed search operation is interrupted.

In one approach, while the magnetic tape 2 is caused to run at a high speed in a high speed search operation, the program numbers recorded on the magnetic tape 2 are reproduced by the program number reproducing circuit 10 and, simultaneously, the search position in which the object program number is recorded is retrieved. However, in the case of the R-DAT format identified above, the program numbers are recorded only in the 300 frames (9 seconds at the speed of ordinary reproducing operation) at the heading section of individual information programs. Therefore when the magnetic tape is caused to run at 200 times the speed of the ordinary reproducing operation, for example, during the high speed search operation, the head passes the part recording the program numbers only during a period of 45 msec.

To solve this problem for the R-DAT format, a so-called relative speed servo technique is employed for realizing the high speed search operation. In particular, the number of rotations of rotary drum 3 is changed in accordance with the running speed of magnetic tape 2. Thus, the relative speed of recorded patterns with respect to the head during the high speed search operation in the R-DAT is fixed. Specifically, during the high speed search operation, the drum rotates at about 200 times its speed in the ordinary reproducing operation. The high rotational speed is used primarily in the REV direction. However, the signal reproduced from the magnetic tape includes a variety of distortions and does not appear in an ideal condition. Therefore, the magnetic tape running speed in the actual high speed search operation has been set to a speed slightly lower than 200 times that of the ordinary reproduction speed. The lower speed is designed to provide a margin for always realizing a stable high speed search operation.

As explained previously it is necessary in the above-described approach to always read the program numbers recorded on the magnetic tape during the high speed search operation. It also is necessary for the running speed of magnetic tape to be set to a speed significantly lower than the upper limit defined by mechanism limitations (for instance, the speed at which the magnetic tape runs stably and is not subject to damage). This speed occurs, for example, at only 150 times the ordinary reproducing speed in order to always read, under a stabilized condition, the subcode information such as program numbers on the magnetic tape.

Because of these competing considerations, the high speed retrieval technique used in the current R-DAT system may not provide sufficient high speed retrieval performance. Moreover, it also has been difficult to exceed the upper limit of the retrieval speed, due to the format used in R-DAT.

SUMMARY OF THE INVENTION

The present invention has been proposed to eliminate problems of the above-described approach. Therefore, it is an object of the present invention to provide an information high speed retrieval apparatus which realizes high speed retrieval of desired information programs based on program numbers recorded on a magnetic tape corresponding to individual recorded information programs.

The high speed information retrieval apparatus of the present invention comprises a rotation detector which detects the rotation of both the supply reel and the take-up reel or either one of them. It also comprises a position information calculation circuit which performs a calculation based on the rotation information from the rotation detector and, thereby, obtains the current position on the magnetic tape. It further comprises a program number reproducing circuit which controls the magnetic tape and head speed at a level equal to the speed in the ordinary reproducing operation.

For example, when the magnetic tape runs at a speed 200 times the speed of the ordinary reproducing operation, the relative speed of the recording patterns with respect to the head according to the relative speed servo technique can be made constant by setting a number of rotations of the rotary drum to about 3000 rpm in the FWD direction and about 1000 rpm in the REV direction. When a high speed search operation is required, i.e., an operation at 200 times the speed of an ordinary reproducing operation in the REV direction, the rotation frequency of rotary drum becomes about 60 msec, based on the number of rotations of the rotary drum.

When such running speeds are used for magnetic tape, the head passes the tape portion recording program numbers in only 45 msec. Therefore, during the high speed search operation at 200 times or more the speed of an ordinary reproducing operation, the tape portion that contains the program numbers passes the head during a single rotation of the rotary drum. As a result, the readout frequency of the program number can be lowered significantly.

In general, multiplex matching of readout data is checked in order to provide reliability to the readout of a subcode during the high speed search operation. Also, at the upper limit of the running speed of the magnetic tape, program numbers recorded on the magnetic tape may be reproduced by using a memory which stores program numbers obtained by reproduction through the program number reproducing circuit and corresponding position information sent from the position information calculation circuit. Using this system the mechanism block is placed into a first high speed running mode when the object program number position is not stored in the memory during the high speed retrieval operation and the mechanism block is placed into a second high speed running mode in which the tape runs at a higher speed than the first high speed running mode when the object program number position is stored in the above memory, thereby significantly improving the retrieval speed in the high speed information retrieval operation.

DETAILED DESCRIPTION OF THE INVENTION

An embodiment of the present invention is explained hereunder with reference to the accompanying drawings.

Figure 1:
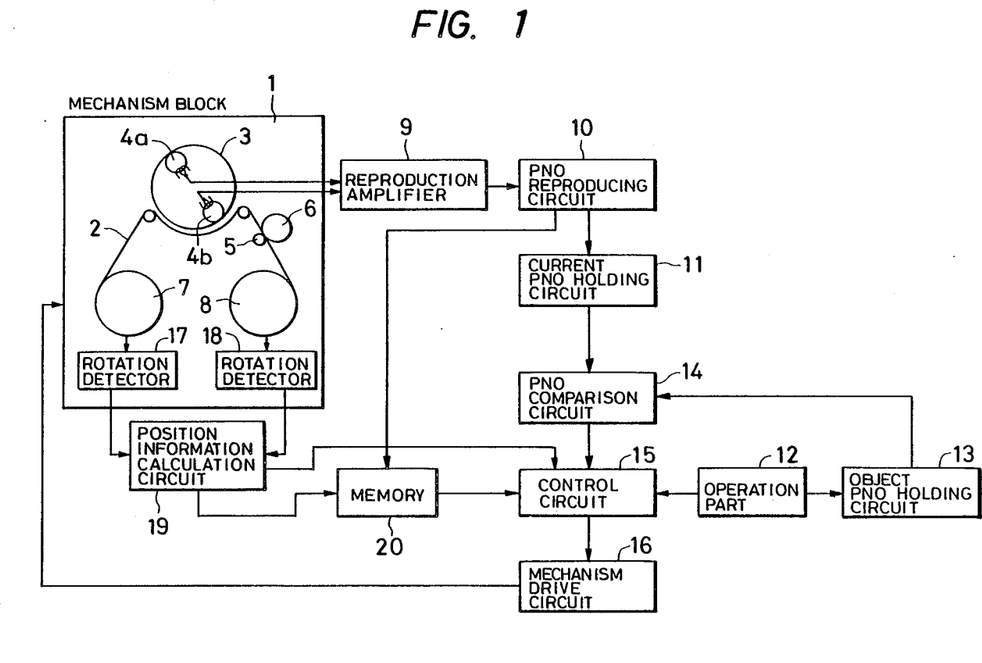
FIG. 1 is a block diagram of a preferred embodiment of the present invention.

FIG. 1 is a block diagram of a preferred embodiment of a high speed information retrieval apparatus of the present invention. The embodiment is for high speed information retrieval in R-DAT. The elements similar to those in FIG. 6 are given an identical reference number and a detailed explanation of these elements is omitted.

In FIG. 1, a rotation detector 17 detects the rotation of the supply reel 7 and a rotation detector 18 detects rotation of the take-up reel 8. A position information calculation circuit 19 carries out a calculation based on rotation information which is output from the rotation detectors 17 and 18 and obtains a current position of the magnetic tape 2. A memory 20, which receives an output from the position information calculation circuit 19. stores, position information concerning the magnetic tape 2, and a corresponding program number for every reproduction of a program number generated by the program number reproducing circuit 10.

Figure 3:
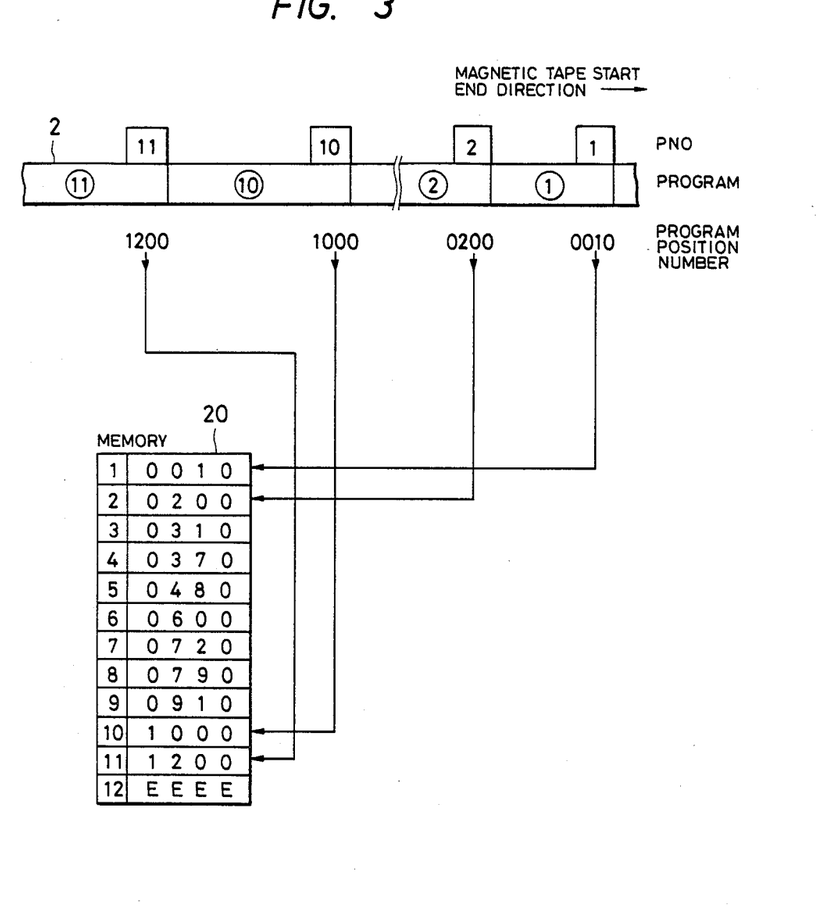
FIG. 3 is a for explaining the memory of the present invention.

FIG. 3 illustrates the storage in the memory 20 of the program numbers, obtained by reproduction through the program number reproducing circuit 10, and corresponding position information on the magnetic tape 2 obtained as an output of the position information calculation circuit 19. Memory 20 stores the program numbers (1-11) recorded at the heading part of individual information programs. The numbers increase in value from the starting end of the magnetic tape 2 to the end thereof. Also stored is the corresponding position information on the magnetic tape 2 (e.g., 0010-1200). The position information "EEEE", corresponding to the program number "12" in FIG. 3, indicates that the position of such program number on the magnetic tape is still unknown. In this example, the position of program number "12" is unknown.

The operation of an apparatus having such structure may be explained with reference to the flowcharts of FIG. 2A and FIG. 2B.

When an instruction for operations such as PLAY, FF, REW, CUE, REVIEW is issued from the operation part 12, the control circuit 15 controls the mechanism drive circuit 16. In this operation mode, circuit 16 drives and controls the mechanism block 1 in the designated operation mode.

For each detection and reproduction of program number information from the magnetic tape 2 by the program number reproducing circuit 10 under the operating condition such as PLAY, FF, REW, CUE and REVIEW. the memory 20 stores outputs of the position information calculation circuit 19. Specifically, the position information on the magnetic tape 2 where the program number information is recorded, corresponding to program numbers obtained by the reproduction as explained above, is stored.

In operation of the invention, program numbers will be reproduced from the magnetic tape 2 by the program number reproducing circuit 10. Also, a search operation for a program number will be designated by the operation part 12. Such program number will be held in the current program number holding circuit 11.

In a first case, the position of an object program number recorded on the magnetic tape may not be known. Specifically, the position information corresponding to the object program number is not stored in the memory 20. In this case, operations similar to these explained with regard to the disadvantageous approach are conducted. The magnetic tape during the high speed search operation is operated in a first high speed running mode. However, as previously explained, the actual speed is reduced in order to permit stable reading of the subcode information, such as the program number. For each detection and reproduction of a program number, as a search is being conducted for an object program number, the memory 20 stores outputs of the position information calculation circuit 19 corresponding to the reproduced program number.

Figure 2A:
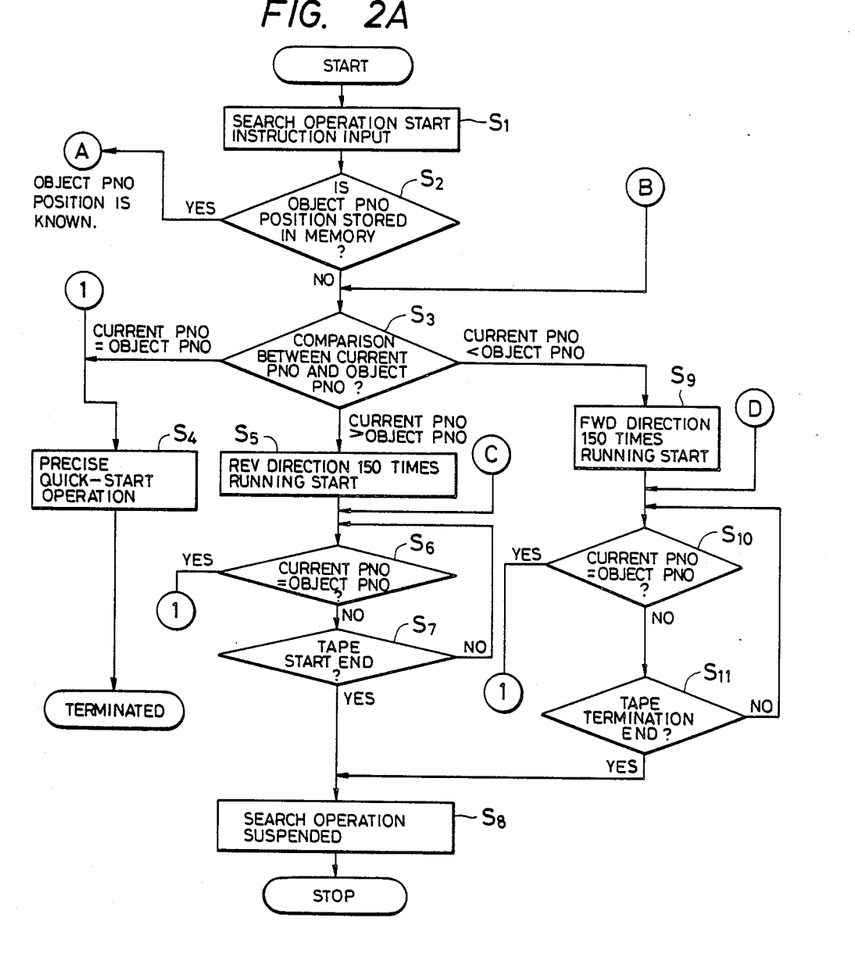
FIG. 2A, FIG. 2B are flowcharts for explaining operations of the embodiment.

Referring to the flowchart of FIG. 2A, when the search operation start instruction is input to the step S1 from the operation part 12, it is decided in the step S2 by the control circuit 15 whether or not the object program number position is stored in the memory 20. When it is decided that the position information for the object program is not stored, the current program number is compared with the object program number by the program number comparison circuit 14 in the step S3.

When the current program number is equal to the object program number, the precise quick-start operation is carried out in the step S4. In case the current program number is larger than the object program number, in step S5. a running (first high speed running mode) in the REV direction is started. This first high speed is only 150 times the operational speed. During this search operation, it is decided in the step S6 whether or not the current program number is equal to the object program number. When both program numbers are equal, the operation moves to the step S4 and a precise quick-start operation is carried out. When the two program numbers are not equal, a determination is made in the step S7 of whether or not the tape is at an end. When the tape is found to be at an end, the search operation is suspended in the step S8, resulting in the stop condition. When the tape is not at an end, the process returns to step S6 where a comparison of the two program numbers is again conducted.

When it is decided in the step S3 that the current program number is smaller than the object program number, step 9 begins and the tape is run at a speed of 150 times the operational speed in the FWD direction (first high speed running mode). Once this step begins, it is also decided in step S10 whether or not the current program number is equal to the object program number during the search operation. When both program numbers become equal, the operation moves to step S4 and the precise quick-start operation is carried out. If both program numbers are not equal, it is decided in the step S11 whether or not the tape end has been detected. When the tape end is detected, the search operation is suspended, resulting in the stop condition in the step S8. When the tape end is not detected, the process returns to step S10 where a comparison of the two program numbers is again conducted.

In the second case, the position on the magnetic tape recording the object program number is known. In this case, the control circuit 15 compares an output of the position information calculation circuit 19, namely the current position on the magnetic tape, with the magnetic tape position of object program number stored in the memory 20. When it is decided that the difference is smaller than a threshold value, namely the object program number is sufficiently close to the current position, the search operation is carried out at the speed of 150 times the operational speed in a manner explained previously.

However, when the distance between the current position and the object program number position is larger than threshold value, the control circuit 15 controls the mechanism drive circuit 16 based on the result of the comparison between the current position information as an output of the position information calculation circuit 19, and the object program number position information stored in the memory 20. The drive circuit 16 will set the mechanism block 1 to the high speed running mode in the FWD or REV direction, as appropriate.

In this case, the running mode need not always be set to a high speed mode in which the subcode information, such as program number, may accurately be read out. Therefore, the running is in the second high speed running mode, which is higher than the first high speed running mode, as explained previously. In this second high speed running mode, the control circuit 15 always compares an output of the position information calculation circuit 19 and the object program number position information stored in the memory 20. When the difference between them is smaller than a threshold value that is, the object program number position is sufficiently close to the current position, the control circuit 15 controls the mechanism drive circuit 16 to set the mechanism block 1 to the first high speed running mode as explained above. Thereafter, the search operation is carried in the same way as that explained for the case where the position of object program number recorded on the magnetic tape is unknown.

Figure 2B:
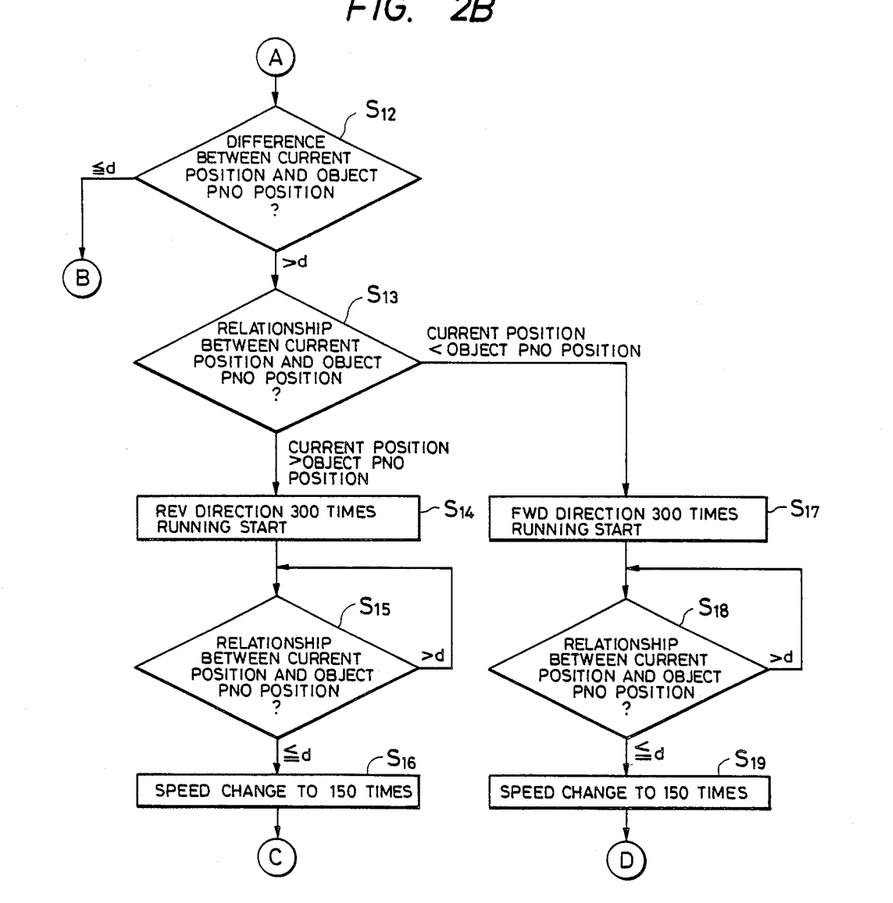

Referring to the flowcharts of FIGS. 2A and 2B, when it is decided in the step S2 that the object program number position is known, the operation moves to the step S12. There the difference between the current position and object program number position is determined. The symbol d in FIG. 2B indicates a threshold value and it is used as an index for deciding whether or not the object program number position is sufficiently close to the current position. In case it is decided in the step S12 that difference is smaller than or equal to d, the operation moves to the step S3 and the first high speed operations, as previously explained, are carried out.

When difference is larger than the threshold value d, the values of the current position and the object program number position are compared in step S13. When the current position is larger than the object program number position, in the step S14 running in the speed of 300 times (second high speed running mode) in the REV direction is started. In the step S15, the current position is compared again with the object program number position. When it is decided that the difference becomes equal to or smaller than the present value d, the speed is changed to 150 times the operation speed in the step S16. Thereafter, the operations explained above are carried out beginning at step S6.

If in the step S13 it is decided that the current position is smaller than the object program number positions, the process moves to step S17 and running (second high speed running mode) is started in the speed of 300 times the operational speed in the FWD direction. In the step S18, the current position is compared with the object program number position. When difference is equal to or smaller than the threshold value d, the speed is changed to 150 times in the step S19 and thereafter operations are carried out in the step S10.

Figure 4:
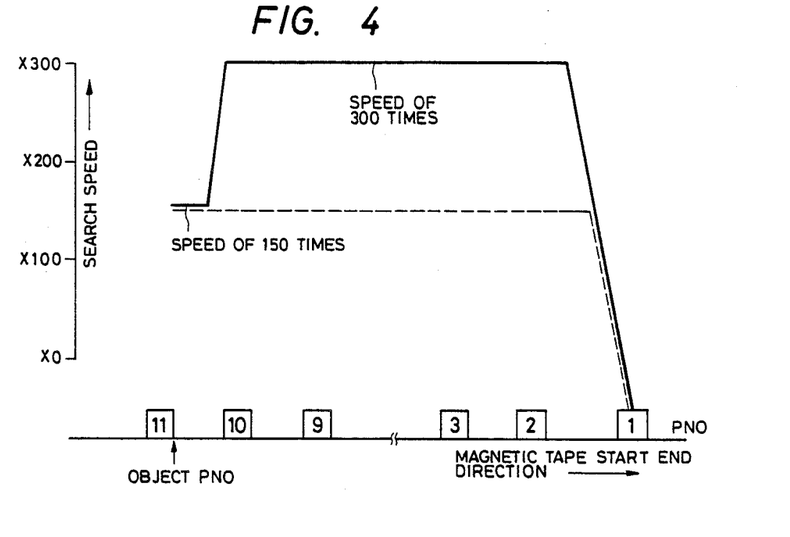
FIG. 4 is a diagram for explaining speed control in the search operation of the embodiment.

FIG. 4 shows the running condition of a magnetic tape during the high speed information retrieval explained above. In this example, the object program number is set to "11". A solid line shows the case where the position information of the object program number is known. At the beginning of the object program number position search (right-most portion of the plotted running condition graph), the magnetic tape is caused to run in the speed of 300 times the operational speed (second high speed running mode). The tape speed is then changed based on the preset value d, to 150 times the operational speed (first high speed running mode) at a time when the object program number position is found to be sufficiently close to the current position.

A dashed line shows the case where the object program number position information is unknown and the magnetic tape is caused to run at the speed of 150 times the operational speed (first high speed running mode) for the entire section. Moreover, the dashed line also indicates the running condition of magnetic tape in above-described disadvantageous approach.

In the embodiment explained previously, when the position information of object program number is unknown, the tape is run in the first high speed running mode, which is rather lower than the second high speed running mode, in order to read the subcode information, such as program number, under the condition that the magnetic tape is always stabilized.

The operation of the present invention can further maximize operational efficiency by making fully use of the position information of program numbers which are already known. As an example, if the position information of the object program number is not known while the position information of a program number in the vicinity of object program number is known, the tape is run at the second high speed running mode, wherein the subcode information such as program number is not always read until close to the vicinity of the known program number position, and thereafter the tape is run in the first high speed running mode. Thereby, a more useful result can be obtained.

Figure 5:
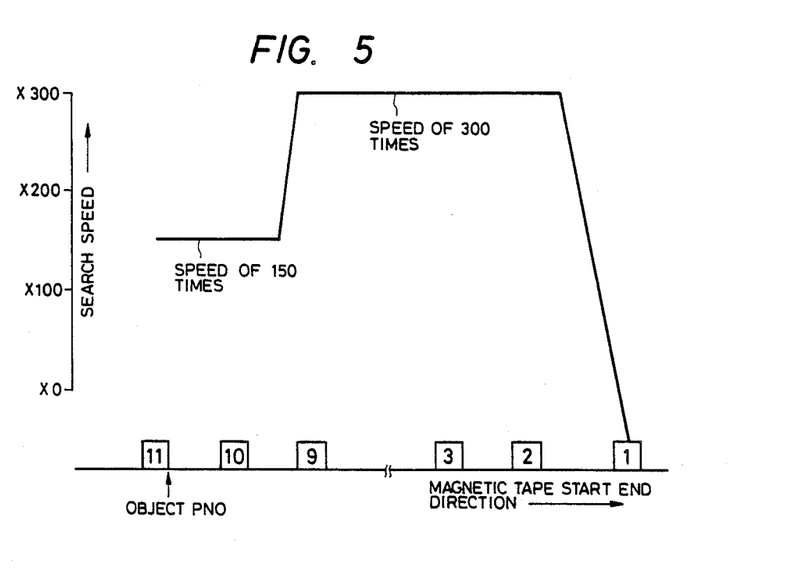
FIG. 5 is a diagram for explaining speed control in the search operation of another embodiment.

FIG. 5 shows the magnetic tape running condition in such a case. The position information having an object program number "11" is unknown and the position information having a program number "10" is known.

In the embodiment explained above, the rotation information of both supply and take-up reels is used as the input to the position information calculation circuit. However, in case such accuracy as detecting rotations of both reels and making calculation is not required, rotation of any one reel is detected and calculation is carried out in order to obtain the position information and thereby realize low cost.

In addition in the embodiment explained previously, writing position information of program number to the memory is gradually carried out when a user makes operations of PLAY, FF and REW. etc. However, it is also possible to automatically carry out the FF or REW operation at the time of loading the magnetic tape and writing is carried out at a different time.

According to the present invention explained earlier, when the position information of object program number is unknown, the magnetic tape is controlled to the first high speed running mode and when the position information of object program number is known, the magnetic tape is controlled to the second high speed running mode which is higher than the first running mode. Thereby, information retrieval operation speed can be improved significantly.

What is claimed is:

1. A high speed information retrieving apparatus, having a mechanism block containing a supply reel and a take-up reel carrying magnetic tape, said mechanism block being operative in at least a normal reproduction speed and a high search speed, which retrieves from the tape and reproduces desired information programs based on program numbers formed on the tape as subcode information recorded in locations corresponding to individual information programs also recorded on the magnetic tape, comprising:

rotation detector means for detecting rotation of at least one of the supply reel and take-up reel and providing rotation information;

position information calculation means for performing calculations based on the rotation information sent from said rotation detector means for providing an indication of the current position of the magnetic tape;

program number reproducing means which reproduces programs numbers recorded on said magnetic tape; and memory means for storing said program numbers obtained from the program number reproducing means and said corresponding position information provided by the position information calculation means;

said retrieving apparatus being operative in the case where an object program number position is not stored in said memory means at the time of high speed search operation to control said mechanism block at a first high speed running mode, and operative in the case where an object program number position is stored in said memory means to control said mechanism block at a second high speed running mode, the speed in the second high speed running mode being higher than the speed in the first high speed running mode.

2. A high speed information retrieving apparatus as claimed in claim 1, further including control means for comparing the output of said calculation means and said memory means having a known position of the desired program stored therein, and for determining the distance separating a current position and an object position of said tape; and     wherein said control means operates said mechanism block in said first high speed mode or said second high speed mode.

3. A high speed information retrieving apparatus as claimed in claim 2, wherein said control means performs said comparison when said mechanism block is in said second high speed mode and maintains said block in said second high speed mode so long as said determined distance is greater than a predetermined threshold.

4. A high speed information retrieving apparatus as claimed in claim 3, wherein said control means shifts said mechanism block from said second high speed mode to said first high speed mode when said determined distance is less than said predetermined threshold.

* * * * *